E. A. HAWTHORNE.
COMBINED BATTERY AND TOOL BOX FOR VEHICLES.
APPLICATION FILED FEB. 5, 1917.
1,306,146
Patented June 10, 1919.
2 SHEETS—SHEET 2.
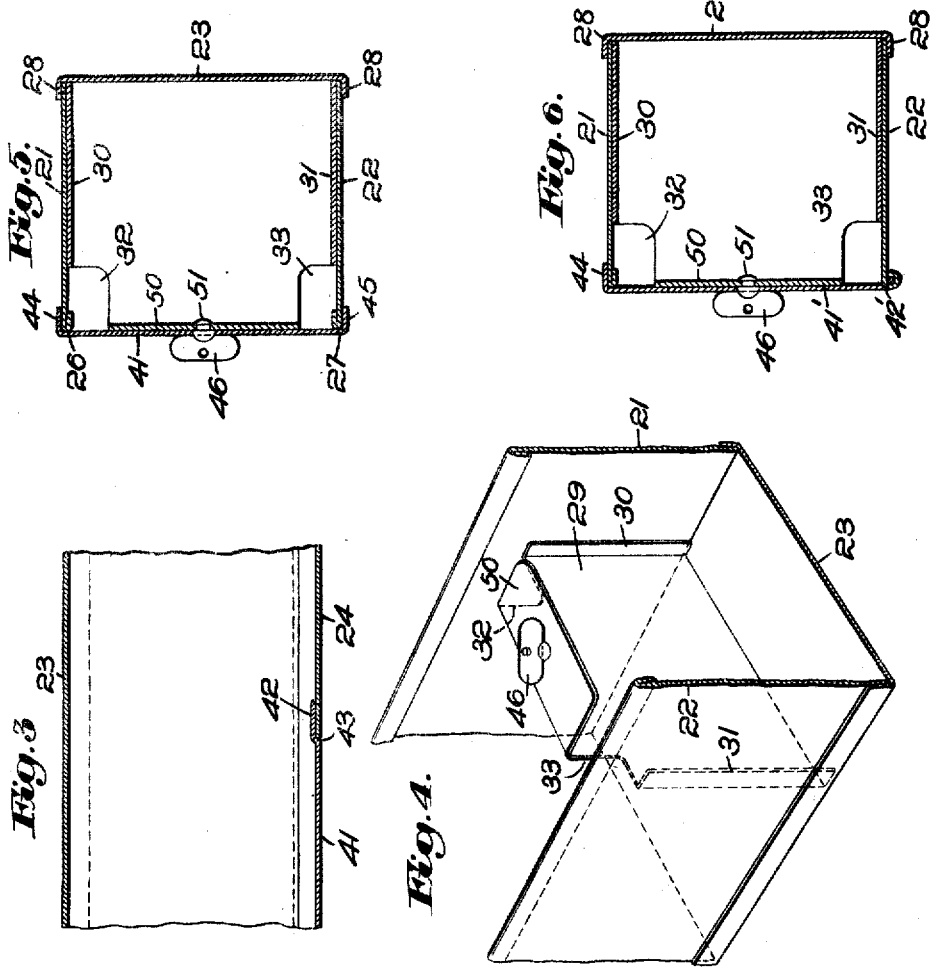
Inventor:
Ellsworth A. Hawthorne
by Emery, Booth, Janney & Varney
Att'ys.

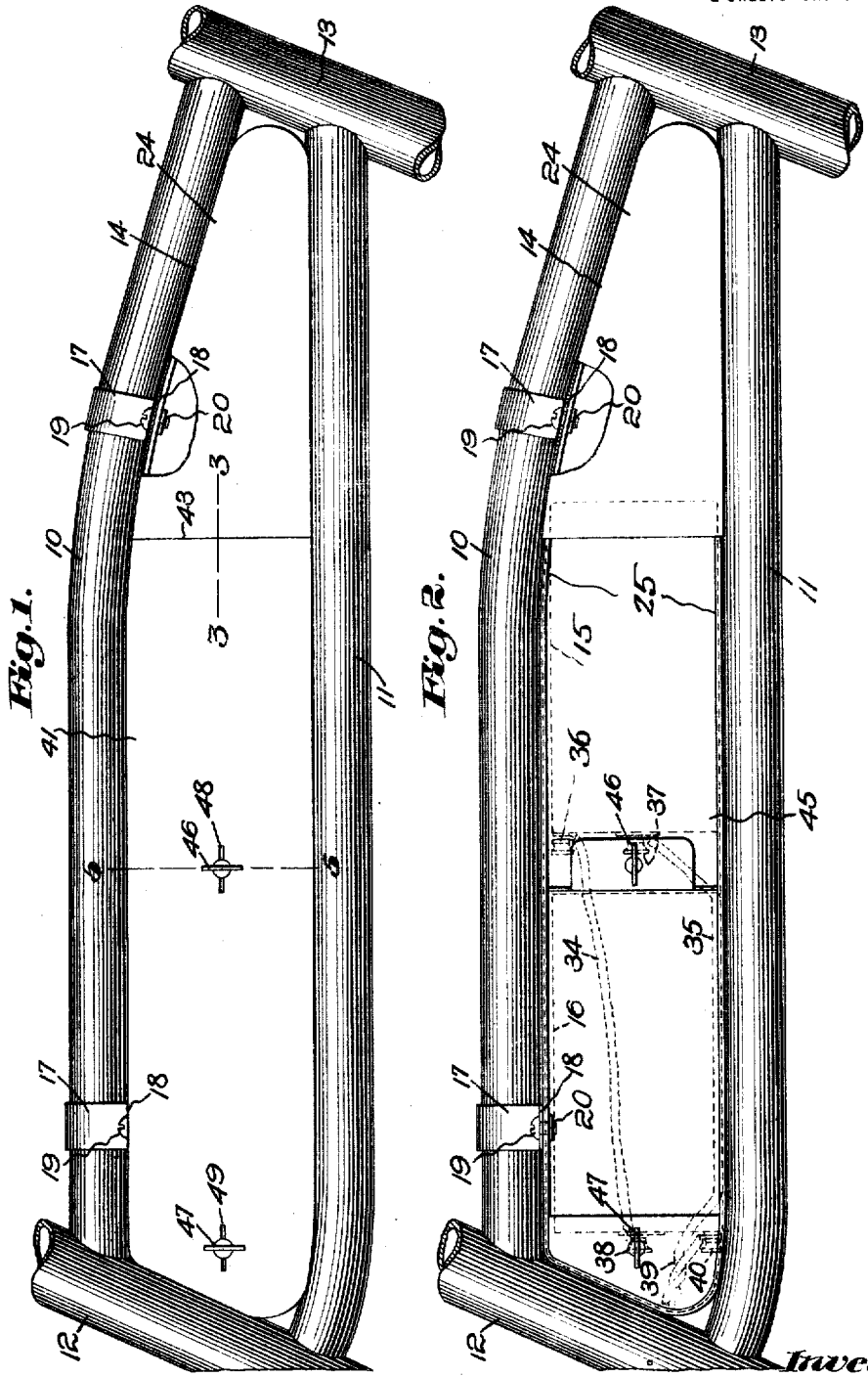

UNITED STATES PATENT OFFICE.

ELLSWORTH A. HAWTHORNE, OF BRIDGEPORT, CONNECTICUT.

COMBINED BATTERY AND TOOL BOX FOR VEHICLES.

1,306,146.  Specification of Letters Patent.  Patented June 10, 1919.

Application filed February 5, 1917. Serial No. 146,655.

*To all whom it may concern:*

Be it known that I, ELLSWORTH A. HAWTHORNE, a citizen of the United States, and a resident of Bridgeport, in the county of Fairfield and State of Connecticut, have invented an Improvement in Combined Battery and Tool Boxes for Vehicles, of which the following description, in connection with the accompanying drawings, is a specification, like characters on the drawings representing like parts.

This invention relates to boxes, and is more especially, though not exclusively, concerned with a combination battery and tool box for bicycles, and with its mounting on the bicycle frame.

My invention will be best understood by reference to the following description, when taken in connection with the accompanying drawings illustrating two specific embodiments thereof, while its scope will be more particularly pointed out in the appended claims.

In the drawings:

Figure 1 is a side elevation of a portion of a bicycle frame and box embodying my invention, a portion of the box being broken away and shown in section;

Fig. 2 is a side elevation, similar to Fig. 1, but with the box cover removed;

Fig. 3 is a sectional view on line 3—3 of Fig. 1;

Fig. 4 is a perspective view of the central portion of the box with the cover removed, and showing a partition and one of the cover locking devices;

Fig. 5 is a sectional view on line 5—5 of Fig. 1; and

Fig. 6 is a sectional view, similar to Fig. 5, but showing a modification of the cover.

Referring to the drawings, I have there shown a portion of a bicycle frame, herein of tubular, metallic construction, comprising upper and lower frame members 10 and 11, and front and rear frame members 12 and 13, respectively. This frame serves as a means for supporting and protecting a preferably metallic box 14, which may serve as a container for tools or batteries, or both. In Fig. 2, I have shown in dotted lines two such batteries, numbered respectively 15 and 16, with their terminals and lead wires also shown in dotted lines.

The profile or contour of the box, as viewed from the side (Figs. 1 and 2) follows to a large extent the outline of the space bounded by the frame members 10, 11, 12 and 13, and thus the box walls forming this contour or profile are, in a considerable measure, reinforced as well as protected from injury by the contacting or adjacent frame members, it being observed that, for the most part, the box snugly fits the boundary of the aperture within which it is disposed. The box may be secured in its place in the frame by any suitable means, but herein it is provided with a plurality of clamps 17, each comprising a collar which partially embraces the upper frame member 10, and is provided with perforated ears 18, through which screws 19 extend into the interior of the box, where they are provided with nuts 20, by means of which the desired clamping action is obtained, and the box is firmly affixed to the frame.

The box is herein provided with an upper wall 21, a lower wall 22, and two side walls 23 and 24. It may be convenient herein to refer to the wall 23 as the back wall, and to the wall 24 as the front wall, since the latter is provided with an aperture 25, serving as the opening or doorway leading into the box. Herein, this aperture has an area less than that of the wall 24 in which it is formed, although in the present instance, the height of the aperture is approximately the same as that of the corresponding space within the box, the height of the aperture being somewhat diminished by reason of the fact that the upper and lower walls 21 and 22 are provided, respectively, with reinforcements 26 and 27 adjacent their front edges. In the present instance, these reinforcements are formed by simply bending the margins of the walls back upon themselves to form a double thickness presenting a smoothly rounded corner, and giving the edge of the aperture a considerable degree of rigidity. As a convenient means for attaching the rear wall 23 to the body of the box, and still further reinforcing the latter, said wall is herein provided with a marginal flange 28, overlapping and secured to the outer faces of the walls in any suitable manner, as by soldering, brazing or welding.

The interior of the box may be, and is herein, divided into two chambers by a partition 29, the latter being herein provided with flanges 30 and 31, secured to the upper and lower walls 21 and 22, respectively, in any suitable manner, as by soldering, brazing or welding. This partition may be, and is herein apertured to provide communication between two chambers which it separates, such communication being herein afforded by two openings 32 and 33. These openings herein serve to permit lead wires 34 and 35 to be extended from terminals 36 and 37 of the battery 15, through such openings into the second chamber, and there connected, one with a terminal 38 of the battery 16, and the other in proximity to a third lead wire 39, the latter being connected to a second terminal 40 of the battery 16. The remainder of the space within the box may be utilized for the storage of any articles, such for example, as tools. If only one battery be employed, the entire remaining chamber may then be devoted to the storage of other articles.

The box may be provided with any suitable cover or closure for the opening 25. In the present instance, there is provided a cover 41, constituting a common closure for the openings of the two chambers, said cover to this end extending across the partition 29. This cover may be hinged, or otherwise suitably attached to the box body. In the form illustrated in Figs. 1 to 5, inclusive, the cover has its outer face flush with the exposed outer face of that portion of the wall 24 which is shown toward the right of Figs. 1 and 2 (see Fig. 3). At one end (at the left of Fig. 1), the cover overlies the front face of the box body, while at its other end (toward the right of Fig. 1), said cover is provided with a species of separable hinged connection formed by providing said cover with an offset portion 42, which underlies the front wall 24 within the box, as best shown in Fig. 3. The offset in the cover provides a shoulder at 43 abutting against the adjacent edge of the margin of the opening 25. Thus, it is evident that when the cover is closed, it is locked against lengthwise movement toward the right (Fig. 3). It is also evident that this construction provides a sort of hinge about which the cover may be swung in an obvious manner, by grasping its opposite end.

As a means for giving the cover the requisite rigidity, and for centering or registering the same with relation to the upper and lower margins of the openings 25, said cover is herein provided with upper and lower flanges 44 and 45, embracing the box body and engaging the outer surface thereof. These marginal flanges are inwardly turned, and therefore embrace the upper and lower walls of the box when the cover is closed.

The cover may be provided with any suitable locking means, but herein I employ two locking devices 46 and 47, pivoted to the body of the box and extending through apertures 48 and 49, respectively, provided in the cover. As will be observed by reference to Fig. 1, these locking devices are elongated in form, and the apertures are similarly shaped. When the cover is to be put in place or removed, the locking devices are turned so as to register with their respective apertures, whereupon the locking devices will pass therethrough in an obvious manner. When the cover is to be locked, the locking devices are turned to some such position as that shown in Fig. 1, so that they extend transversely of the elongated apertures, thus locking the cover in place.

The locking devices 46 and 47 may be rotatively mounted on the box body in any suitable manner, but herein one is supported by the partition 29, and the other by the front wall 24 of the box. The partition, to this end, is herein provided with a wall 50, preferably integral therewith and underlying the inner face of the cover 41 which abuts thereagainst (see Figs. 4 and 5). This wall forms a support for the central portion of the cover, and greatly strengthens the latter when in place. The locking device 46 is herein provided with a base forming a species of rivet 51, which passes through the wall 50 and is headed over on the inner face of the latter.

If desired, the cover may be permanently hinged to the box, and in the modification shown in Fig. 6, I have illustrated a cover 41' permanently hinged at 42' at its lower edge to the box body. I prefer, however, to make the cover or door actually removable, as in the form first described, because should the bicycle fall over on its side, and the cover become damaged, the cover alone could be easily replaced, without replacing the whole box. Moreover, with the cover permanently hinged to the box, there would be much greater likelihood of the cover being damaged if left open, should the bicycle fall over on its side. Still another advantage secured by making the cover actually removable is the facility which it affords for the insertion of the battery or batteries, and the convenient access to lamp bulbs, tools, or other articles stored in the box.

While I have herein shown and described two specific forms or embodiments of my invention for illustrative purposes, and have disclosed and discussed in detail the constructions and arrangements incidental to two specific applications thereof, it is to be understood that the invention is limited neither to the mere details or relative arrangements of parts, nor to the specific embodiments herein shown, but that extensive deviations from the illustrated forms or embodiments of the invention may be made, without departing from the principles thereof.

Having thus described two specific forms or embodiments of my invention, what I claim and desire by Letters Patent to secure is:

1. The combination of a supporting frame forming an inclosure having lateral openings, a box disposed in said inclosure and having a partition dividing its interior into two chambers, each having a lateral opening leading to the exterior of said box, a common closure for the last-mentioned openings, said closure extending across said partition, and means supported by said partition for fastening said closure in place.

2. The combination of a supporting frame forming an inclosure having lateral openings, a box disposed in said inclosure and having a partition dividing its interior into two chambers, each having a lateral opening leading to the exterior of said box, a common closure for the last-mentioned openings, said closure extending across said partition, means for fastening said closure in place, and a support for said means, said support being supported on said partition.

3. The combination of a supporting frame forming an inclosure having lateral openings, a box disposed in said inclosure and having a partition dividing its interior into two chambers each having a lateral opening leading to the exterior of said box, said partition being provided with an integral wall at an angle thereto, a closure extending across said partition and said wall, and means supported by said wall for fastening said closure.

4. The combination of a supporting frame forming an inclosure having lateral openings, a box disposed in said inclosure and having a partition dividing its interior into two chambers each having a lateral opening leading to the exterior of said box, a common closure for the last-mentioned openings, said closure extending across said partition and being provided with an aperture, and locking means supported by said partition and extending through said aperture.

5. The combination of a supporting frame forming an inclosure having lateral openings, a box disposed in said inclosure and having a partition dividing its interior into two chambers each having a lateral opening leading to the exterior of said box, a common closure for the last-mentioned openings, said closure extending across said partition and being provided with an elongated aperture, and a rotatable locking device supported by said partition and extending through said aperture, said locking device being normally disposed transversely of said elongated aperture.

6. The combination of a supporting frame forming an inclosure having lateral openings, a box disposed in said inclosure and having a partition dividing its interior into two chambers each having a lateral opening leading to the exterior of said box, said partition being provided with an integral wall at an angle thereto, a closure extending across said partition and said wall and provided with an aperture, and a locking device pivoted on said wall and extending through said aperture.

7. The combination of a supporting frame forming an inclosure having lateral openings, a box disposed in said inclosure and having a wall provided with a lateral opening, and a cover for said opening, said cover having a part overlying said wall outside said box and having a part underlying said wall within said box.

8. The combination of a supporting frame forming an inclosure having lateral openings, a box disposed in said inclosure and having a wall provided with a lateral opening, and a cover for said opening, said cover having a portion of its outer face substantially flush with the outer face of said wall and said cover having a part underlying said wall within said box, and a shoulder abutting against the edge of a margin of said opening adjacent said underlying part.

9. The combination of a supporting frame forming an inclosure having lateral openings, a box disposed in said inclosure and having a wall provided with a lateral opening, a cover for said opening, said cover having a part overlying said wall outside said box and having a part underlying said wall within said box, and means to secure said overlying part to said wall.

10. The combination of a supporting frame forming an inclosure having lateral openings, a box body disposed in said inclosure and having opposite walls provided with reinforced margins bounding a lateral opening, a third wall opposite said opening and having reinforcing flanges secured to the first-mentioned walls, a closure for said opening, said closure being provided with reinforcing flanges contacting with said reinforced margins, and reinforcing means connecting the first-mentioned walls to each other.

11. The combination of a supporting frame forming an inclosure having lateral openings, a box body disposed in said inclosure and having opposite walls provided with reinforced margins bounding a lateral opening, a third wall opposite said opening and having reinforcing flanges secured to the first-mentioned walls, a closure for said opening, said closure being provided with reinforcing flanges contacting with said reinforced margins, and reinforcing means for said walls and said cover, extending transversely thereof.

In testimony whereof I have signed my name to this specification.

ELLSWORTH A. HAWTHORNE.